June 1, 1937. C. W. VAN RANST 2,082,129
CLUTCH MECHANISM
Filed Sept. 7, 1934
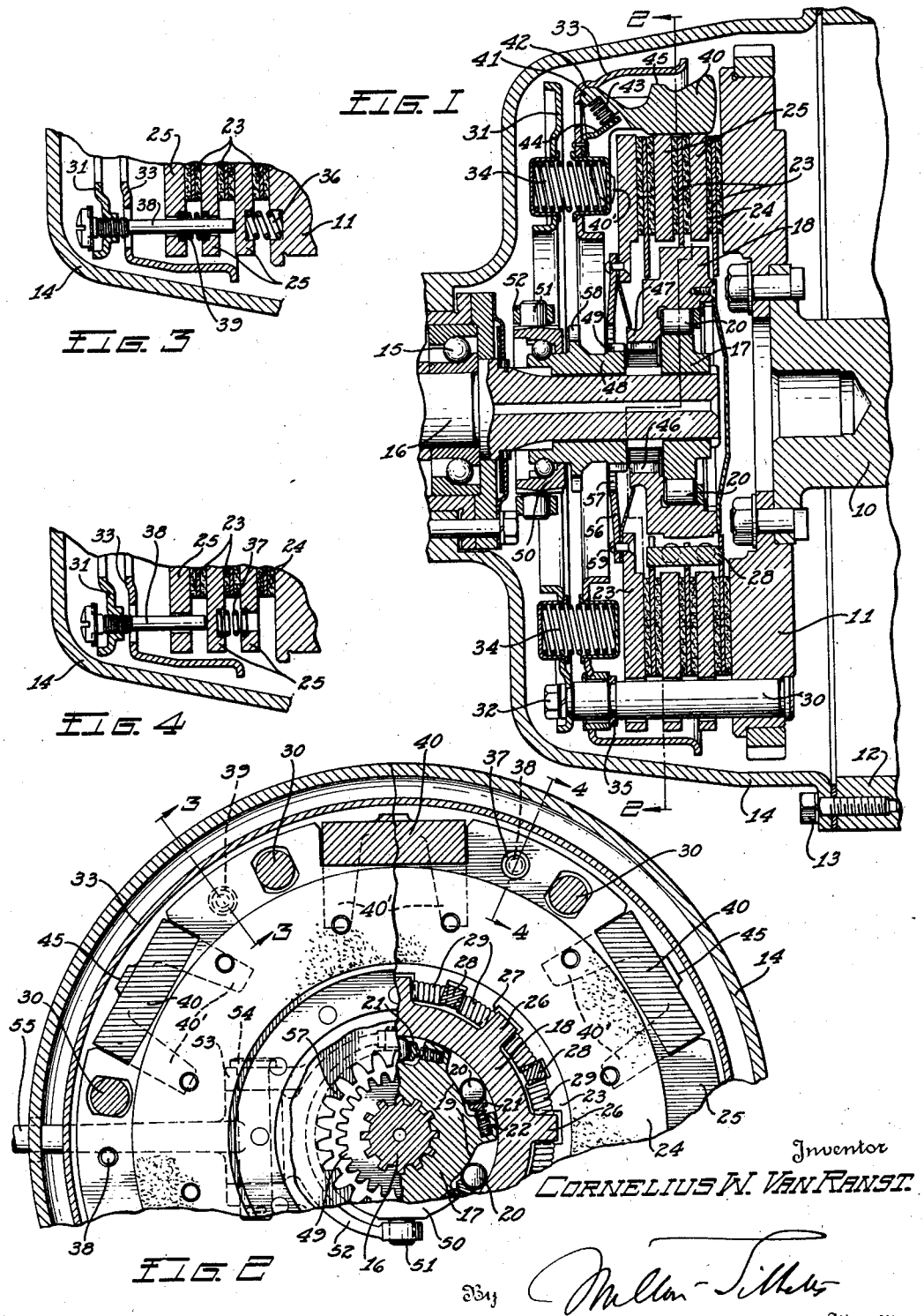
Inventor
CORNELIUS N. VAN RANST
By Mellon-Titles
Attorney Patented June 1, 1937

2,082,129

UNITED STATES PATENT OFFICE 2,082,129

CLUTCH MECHANISM

Cornelius W. Van Ranst, Detroit, Mich., assignor to Packard Motor Car Company, Detroit, Mich., a corporation of Michigan Application September 7, 1934, Serial No. 743,104

7 Claims. (Cl. 192—48)

This invention relates to clutch mechanisms and more particularly to clutch mechanism useful in automotive vehicles.

One of the objects of the invention is to provide a clutch mechanism in which there is an automatically controlled friction driving connection and an over-running driving connection.

Another object of the invention is to provide a clutch mechanism in which the driving connection can be established either positive or over-running at will.

Another object of the invention is to provide centrifugal clutch control means in which the weight members are always balanced irrespective of clutch wear.

A further object of the invention is to provide driving means in which there is a clutch mechanism having an over-running driving connection and a manually maintained positive driving connection which shunts the clutch mechanism.

Still another object of the invention is to provide a new and novel form of automatic control means for clutch mechanism.

Other objects of the invention will appear from the following description taken in connection with the drawing, which forms a part of this specification, and in which:

Fig. 1 is a vertical sectional view of a portion of a power mechanism having my invention incorporated therewith;

Fig. 2 is a sectional view of the clutch mechanism taken substantially on line 2—2 of Fig. 1;

Fig. 3 is a sectional view through the clutch mechanism illustrating the clutch plate spacing means taken on line 3—3 of Fig. 2;

Fig. 4 is a similar sectional view taken on line 4—4 of Fig. 2.

The crankshaft of an internal combustion engine is indicated at 10 and mounted on the end thereof is the usual flywheel 11. Fixed to an open end of the engine casing 12 by bolts 13 is a flywheel and clutch enclosing housing 14. The end of the housing, remote from the engine casing, is of reduced diameter and carries bearing means 15 through which the end of the driven shaft 16 extends and is mounted.

Between the driven shaft and the flywheel is mounted clutch mechanism in which there is an automatically controlled friction driving connection, a positive driving connection from the friction connection and an over-running driving connection from the friction connection. There is also a positive driving connection between a portion of the frictional driving connection and the driven shaft to establish a positive drive between the flywheel and the driven shaft when desired.

Telescoped to the end of the driven shaft is a clutch hub structure consisting of an inner section 17 and an outer section 18. The section 17 is splined to rotate with the driven shaft and between the inner and outer hub sections is arranged an over-running driving connection. The peripheral portion of the inner section is formed with a plurality of recesses having inclined surfaces 19 on which rollers 20 are mounted. Associated with each roller is a follower 21 which is engaged by a coil spring 22 tending to force the roller toward the shallow end of the associated recess to wedge the roller between the inclined surfaces of the inner hub section and the inner surface of the outer hub section. Due to this over-running driving connection, the engine can operate at a slower speed than the driven shaft when the friction means of the clutch is engaged.

Extending around the outer hub section are a plurality of clutch driven ring plates 23 having friction means 24 associated with the faces thereof. Driving clutch disc plates 25 are associated with the plates 23 in the usual manner to form a friction driving connection between the flywheel and the outer clutch hub section. The periphery of the outer hub section is formed with radially extending ears 26 and the inner portions of two of the ring plates are cut away to provide tongues 27 which extend between adjacent ears 26. Pins 28 are fixed to the clutch driven ring plate 23, nearest the flywheel, and extend through openings in the other disc ring plates 23. Coil springs 29 are arranged between the pins 28 and the adjacent ears 26 and thus form a resilient drive between the ring plates 23 and the outer clutch hub section 18.

Driving pins 30 are fixed to the flywheel and extend through aligned openings in the clutch plates 25 and to the end of such pins, remote from the flywheel, is anchored a backing plate 31 held in fixed relation by nuts 32. A cup-shaped bearing plate 33 is mounted to slide a restricted distance axially on the driving pins and between the backing plate and the bearing plate are arranged a plurality of coil springs 34 which normally urge the bearing plate toward the flywheel and into contact with stop members 35 fixed on the driving pins 30. Coil springs 36 are arranged between the flywheel and the adjacent clutch disc plate 25 to normally space them apart and a coil spring 37 is arranged between the intermediate disc plate 25 and the disc plate adjacent the flywheel to space the same axially apart, the movement of the intermediate plate from the plate adjacent to the flywheel being limited by stop members 38 in the form of studs adjustably associated with the backing plate and extending through openings in the bearing plate. Coil springs 39 normally separate the intermediate disc plate 25 and the disc plate 25 remote from the flywheel.

Automatic means is associated with the friction plates of the clutch mechanism for establishing a driving connection therebetween. This automatic mechanism is designed so that the plate clutch mechanism will be engaged when the flywheel is turning above a predetermined R. P. M., for example the speed of rotation at which engine idling occurs, and disengaged below such speed. Angular centrifugal members are formed with rounded apexes 41 which are seated in complementary bearing surfaces 42 formed on the slidable bearing plate 33. The weighted arm portions 40 of such members normally lie adjacent the periphery of the rear clutch disc plate 25 while the other portions of such members comprise two arms 40' which provide actuator means for engaging the clutch plate 25 remote from the flywheel. Each of the centrifugal actuator members is formed with a recessed portion, adjacent its apex, for seating a coil spring 43 which bears against bracket means 44 fixed to the bearing plate. The function of these springs 43 is to normally maintain the centrifugal members in the position shown in Fig. 1 under which circumstances the engine is at rest or the flywheel is rotating at or below engine idling speed. As soon as the flywheel rotation is above engine idling speed, the weighted arms 40 move outwardly, due to the action of centrifugal force, and the arms 40' move in a direction forcing the adjacent clutch plate 25 toward the flywheel thus pressing the plates 25 and 23 into driving relation with each other and the flywheel. As the speed of rotation increases, the arms 40' of the centrifugal members become fulcrums on which the centrifugal members rock and thus the bearing plate 33 is moved toward the backing plate 31 compressing the springs 34 and at the same time maintaining the plates 23 and 25 in connected driving relation.

The flanged portion of the bearing plate serves as a stop for bearing portions 45 on the arms of the centrifugal members and thus the weights will move the same distance and will be balanced around the periphery of the clutch structure. Due to this arrangement of the control member with the clutch and the bearing members, the balance will be maintained even after the clutch plates have worn to some extent.

There are some occasions when the over-running drive between the hub section 18 and the driven member is not desirable. In order that there may be a positive driving connection between the outer hub section 18 and the driven shaft 16, I form internal teeth 46 on a flanged portion 47 of the outer clutch hub section and I also provide a control sleeve 48 with teeth 49 formed on one end thereof which are engageable with the teeth 46. This sleeve is splined on the driven shaft and is movable axially thereon. A collar 50 is associated with the sleeve 48 and is provided with bosses 51 on which is pivotally mounted a yoke 52 which partially encircles the collar and is formed at its end with ears 53 through which pin 54 extends. A lever 55 is pivotally mounted on this pin and extends through the casing 14 to a position where it can be controlled by the operator. Through means of this mechanism, the sleeve 48 can be shifted axially on the driven shaft 16 to engage or disengage the teeth 49 and the teeth 46 thus establishing or disconnecting the positive drive between the friction clutch mechanism and the driven shaft.

With the above positive driving connection, there will of course be no drive transmitted when the automatic control means are in the position shown in Fig. 1, that is, when the engine is idling. Occasionally it is desirable to positively connect the crankshaft directly with the driven shaft and therefore I associate means for this purpose with the friction clutch mechanism and the control sleeve. Fixed to the clutch plate 25 remote from the flywheel is a ring plate 56 having internal teeth 57. On the sleeve 48 is formed teeth 58 which are arranged so that they will mesh with the teeth 57 when the sleeve 48 is moved axially to its extreme position toward the flywheel. I preferably arrange this positive driving connection between the flywheel and the driven shaft so that the connection must be manually maintained. The driving pins 30 are fixed to the flywheel and rotate the plates 25 therewith so that attachment of the ring plate 56 by means of rivets 59 to one of the driving plates 25 will establish a direct drive between the flywheel and the driven shaft when the teeth 58 on the sleeve 48 are in mesh with the teeth 57.

It will be seen that initial movement of the sleeve toward the right will cause a direct drive through the friction clutch which shunts the over-running driving connection and that, when the teeth 58 mesh with the teeth 57, then there is a direct drive between the flywheel and the driven shaft which shunts both the friction clutch and the over-running driving connection.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. A clutch comprising driving members, driven members between said driving members and axially aligned therewith, a bearing plate fixed to rotate with said driving members and having a flanged portion overlying the periphery of some of said driving members and in spaced relation therewith, spring means urging said plate in a direction toward said driving and driven members, and angular control members fulcrumed at their apex on said bearing plate, one leg of said control members normally resting on the periphery of said driving members and the other leg of said control members lying in close proximity to a face of one of the driving members, said control members shifting on their fulcrums when the speed of rotation of said driving members is above a predetermined R. P. M. to press said driving and driven members together, the flanged portion of said bearing plate being disposed to act as a stop to limit the movement of said control members by centrifugal force.

2. In a power transmission mechanism, the combination of a driven shaft, a clutch having driving and driven elements adapted to be pressed together, centrifugally operated means controlling the relation of said elements, a hub section driven by said driven elements, a hub section fixed to said shaft, an over-running drive connection between said hub sections, teeth on said hub section driven by said driven elements, a tooth member fixed to one of said driving elements, and a sleeve splined on said shaft and having tooth means manually shiftable to engage the teeth on said hub section driven by said driven clutch elements and the tooth member fixed to said driving element.

3. A clutch mechanism comprising a driving element, a driven element, a pressure plate connected to rotate with said driving element, driving plate means fixed to said driven element, speed controlled means for automatically shifting said pressure plate into driving relation with said driven plate means above a predetermined rotational speed of the driving element, means exerting pressure to move said pressure plate out of driving relation with said driven plate means, and means shiftable to establish a direct positive driving relation from said pressure plate to said driven element.

4. A clutch mechanism comprising a driving element, a driven element, driven plate means connected in driving relation with said driven element, pressure plate means associated with said driven plate means, a backing plate, a bearing plate intermediate said backing plate and said pressure plate means, bolt means fixed at one end to said driving element and fixed at the other end to said backing plate, said bearing plate and said pressure plate means having a limited movement in an axial direction on said bolt means, spring means engaging said backing plate and exerting pressure against said bearing plate in a direction toward said pressure plate means, a speed responsive pressure plate control means carried by said bearing plate, said control means being effective to move said pressure plate means into driving relation with said driven plates above a predetermined rotational speed of said driving element, and spring means exerting pressure to maintain said pressure plate means out of driving relation with said driven plate means below the predetermined rotational speed of said driving element.

5. A clutch mechanism comprising a driving element, a driven element, driven plate means connected in driving relation with said driven element, pressure plate means associated with said driven plate means, a backing plate, a bearing plate intermediate said backing plate and said pressure plate means, said bearing plate forming a housing partially surrounding said driven plate means and said pressure plate means, bolt means fixed at one end to said driving element and fixed at the other end to said backing plate, said backing plate and said pressure plate means having a limited movement in an axial direction on said bolt means, spring means engaging said backing plate and exerting pressure against said bearing plate in a direction toward said pressure plate means, speed responsive weight means pivotally carried by said bearing plate and partially overlying said driven plate means and said pressure plate means and lying substantially within said bearing plate, said control means being effective to move said pressure plate means into driving relation with said driven plate means above a predetermined rotational speed of said driving element, and spring means exerting a pressure to maintain said pressure plate means out of driving relation with said driven plate means below the rotational speed of said driving element.

6. A clutch mechanism comprising a driving element, a driven element, driven plate means connected in driving relation with said driven element, pressure plate means associated with said driven plate means, a backing plate, a bearing plate intermediate said backing plate and said pressure plate means, bolt means fixed at one end to said driving element and fixed at the other end to said backing plate, said bearing plate and said pressure plate means having a limited movement in an axial direction on said bolt means, spring means engaging said backing plate and exerting a pressure against said bearing plate in a direction toward said pressure plate means, weight means pivotally mounted on said bearing plate and associated with said pressure plate means to move the same into driving relation with said driven plate means above a predetermined rotational speed of said driving element, bracket means fixed on said bearing plate, and springs seated on said brackets and engaging said weight means, said springs exerting pressure against said weight means in a direction urging the same into an ineffective relation with said pressure plate means.

7. A clutch mechanism comprising a driving element, a driven element, driven plate means connected in driving relation with said driven element, pressure plate means associated with said driven plate means, a backing plate, a bearing plate intermediate said backing plate and said pressure plate means, bolt means fixed at one end to said driving element and fixed at the other end to said backing plate, said bearing plate and said pressure plate means having a limited movement in an axial direction on said bolt means, spring means exerting a pressure to space said bearing plate from said backing plate, and speed responsive control means carried by said bearing plate effective to engage the pressure plate means in driving relation with said driven plate means above a predetermined rotational speed of said driving element.

CORNELIUS W. VAN RANST.